Figure 1:
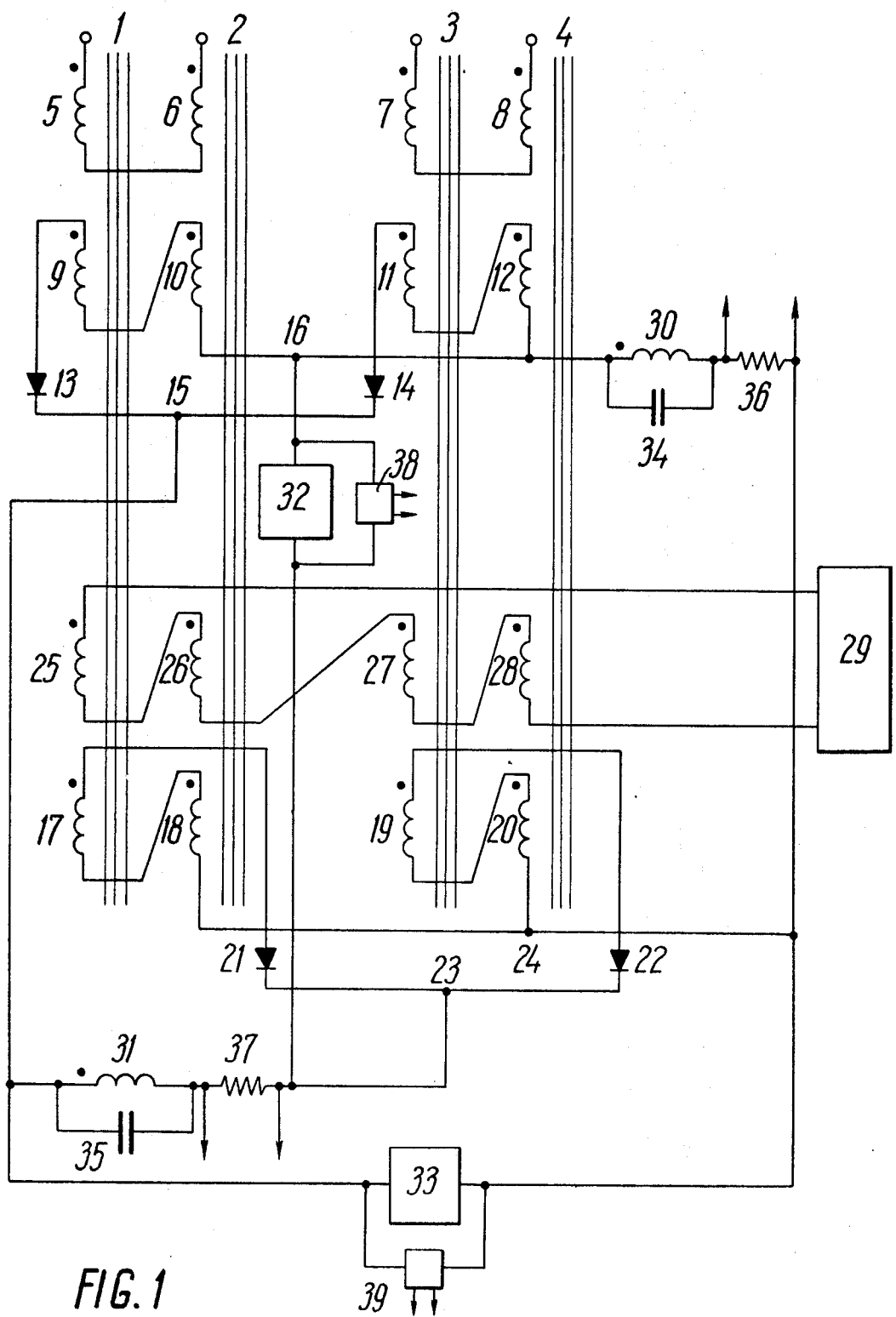

United States Patent

[11] 3,611,087

[72] Inventor Isaak Maximovich Shtein
9, Parkovaya ulitsa, 47, korpus 1, kv. 18, Moscow, U.S.S.R.
[21] Appl. No. 37,413
[22] Filed May 12, 1970
[45] Patented Oct. 5, 1971
Continuation of application Ser. No. 656,897, July 28, 1967, now abandoned.

[54] FREQUENCY-CONTROLLED AC DRIVE
8 Claims, 5 Drawing Figs.
[52] U.S. Cl. ............................................. 318/229, 318/231
[51] Int. Cl. ...................................................... H02p 7/40
[50] Field of Search ........................................... 318/228, 229, 231

[56] References Cited
UNITED STATES PATENTS
| | | | |
|---|---|---|---|
| 3,127,547 | 3/1964 | Biringer et al. | 318/231 X |
| 3,209,226 | 9/1965 | Foote | 318/229 |
| 3,364,414 | 1/1968 | Paulus | 318/229 X |

Primary Examiner—Gene Z. Rubinson
Attorney—Waters, Roditi, Schwartz & Nissen

ABSTRACT: As is well known, a six-phase thyristor circuit of a so-called cycloconverter provided with 36 thyristors allows an output frequency at the order of 15 to 20 c.p.s. to be produced with the network frequency being equal to 60 c.p.s. A frequency-controlled AC drive of the invention is based on the use of modulation apparatus of nonreversible magnetic amplifiers with an output of second harmonics and diodes, which simultaneously perform functions of demodulators and internal feedback tubes. Thyristors are employed for varying the direction of current in the windings of the motors. For a three-phase motor provided with six-phase magnetic amplifiers, there are required in total 6 thyristors and 36 noncontrolled diodes. Thus an output frequency is obtained ranging from 0 to 90 percent of the network frequency. Hence, at a frequency of 60 c.p.s. it is possible to achieve a gradual variation in frequency from 0 to 50-55 c.p.s. Efficiency of the modulators based on double magnetic amplifiers attains even with low powers a value of the order of 80 percent. Even with low frequencies and voltages, the output voltage will approximate a sinusoidal one. The present invention may be used at increased network frequencies of the order of 400 to 500 c.p.s. for driving induction and synchronous alternating current motors of an increased rotation speed.

FREQUENCY-CONTROLLED AC DRIVE

This is a continuation of application Ser. No. 656,897, filed July 28, 1967 now abandoned.

The present invention relates to alternating-current drives and, more particularly, to fequency-controlled AC drives.

Known in the art are frequency-controlled AC drives comprising magnetic amplifiers included in each phase of an electric motor and operating in the mode of line frequency modulation effected by variable frequency supplied by an auxiliary generator and provided with subsequent demodulation.

Two-stage magnetic amplifiers with a DC output, internal feedback and power-circuit ballast resistors are used as modulators in the above-mentioned electric drives. As a result, the efficiency of the magnetic amplifier drops sharply and is usually not higher than 20 to 25 percent (cf. AEG Mitteilungen, 1963, Vol. 53, No. 3–4, PP. 133–140).

The maximum output frequency of known frequency-controlled electric drives operated from AC sources having 50 c.p.s. frequency does not exceed 10 c.p.s. In the case of an electric drive incorporating an electric motor with a single pair of poles, such an output frequency corresponds to a maximum speed of 600 r.p.m. Besides that, these frequency-controlled electric drives require a master control generator capable of providing a multiphase control voltage having a preset phase shift (equal to 120° for three-phase motors, and to 90° for two-phase motors) throughout the entire range of controlled frequency.

An object of this invention is to increase the efficiency of the electric drive, extend its range of control, improve its power gain, reduce the required power output of the magnetic amplifiers employed and simplify the system of control in cases wherein the electric drive incorporates a two-phase induction motor.

In accordance with the present invention, a favorable solution of the above and other problems can be attained by providing the frequency-controlled AC drive with a single-stage magnetic amplifier having two double-frequency outputs, each of which is formed of the amplifier secondary windings and demodulator diodes, both amplifier outputs being connected with two semiwindings of one of the motor phases so as to form a bridge circuit, into each of whose diagonals noncontact, e.g. thyristor, switches operating in succession are inserted.

The power gain of the magnetic amplifier with a double-frequency output is improved by providing center point circuit connection of the demodulator diodes so that a positive current feedback is set up during the positive half-cycle of the controlling AC voltage and a negative feedback is established during the negative half-cycle. Owing to the establishment of the internal feedback, the frequency and phase voltage shift at the output of the amplifier after demodulation and switching of the noncontact switches is twice as low as the frequency and phase voltage shift at the input of the amplifier. This feature of the electric drive provided in accordance with the invention insures a considerable simplification of the control system when a two-phase motor is involved since an antiparallel or antiseries connection of the inputs of the magnetic amplifiers of individual phases of the motor to the single phase master generator can be employed in this particular case.

Figure 2:
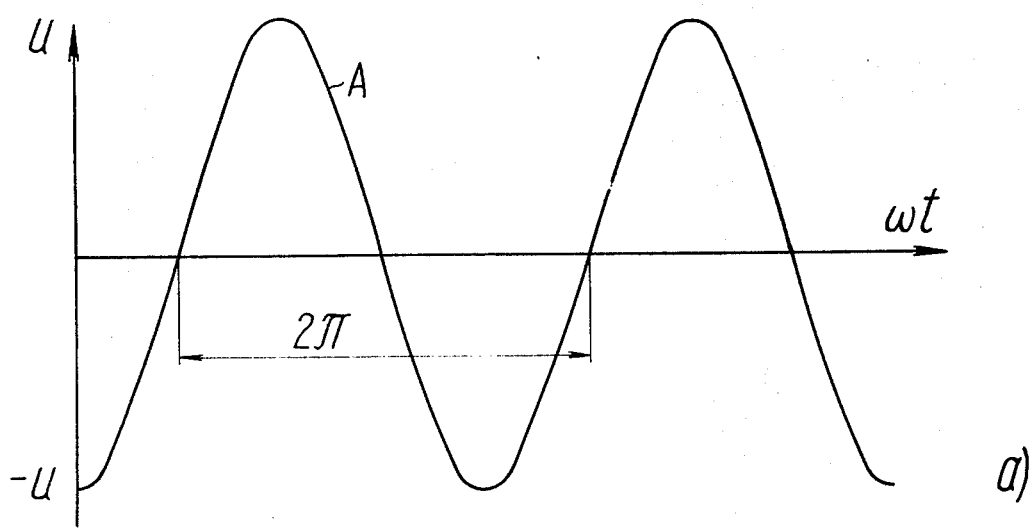
Figure 2:
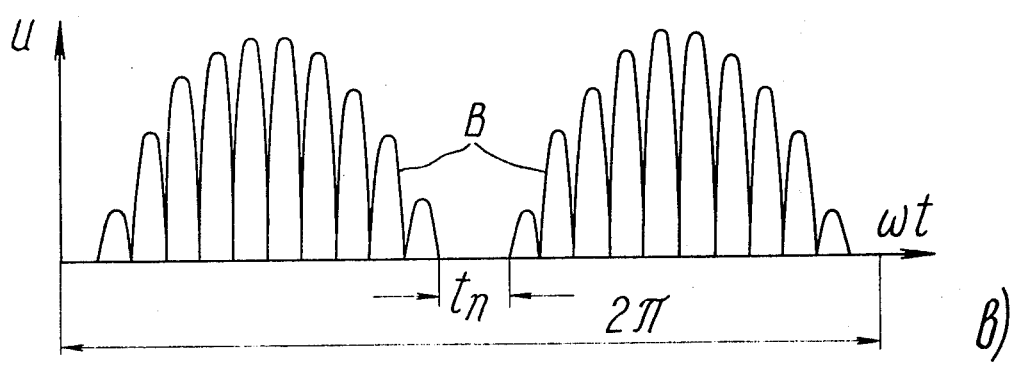
Figure 2:
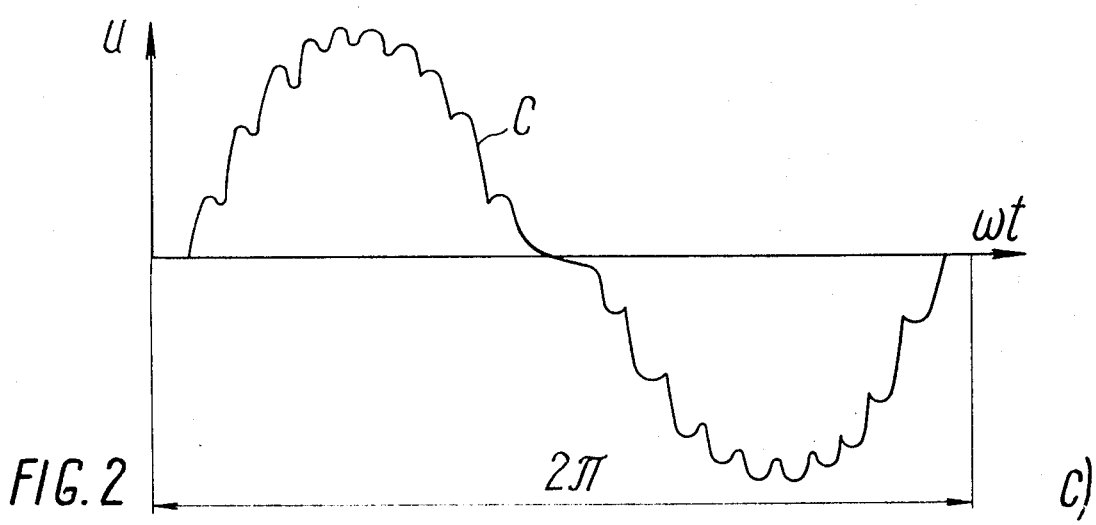
Figure 3:
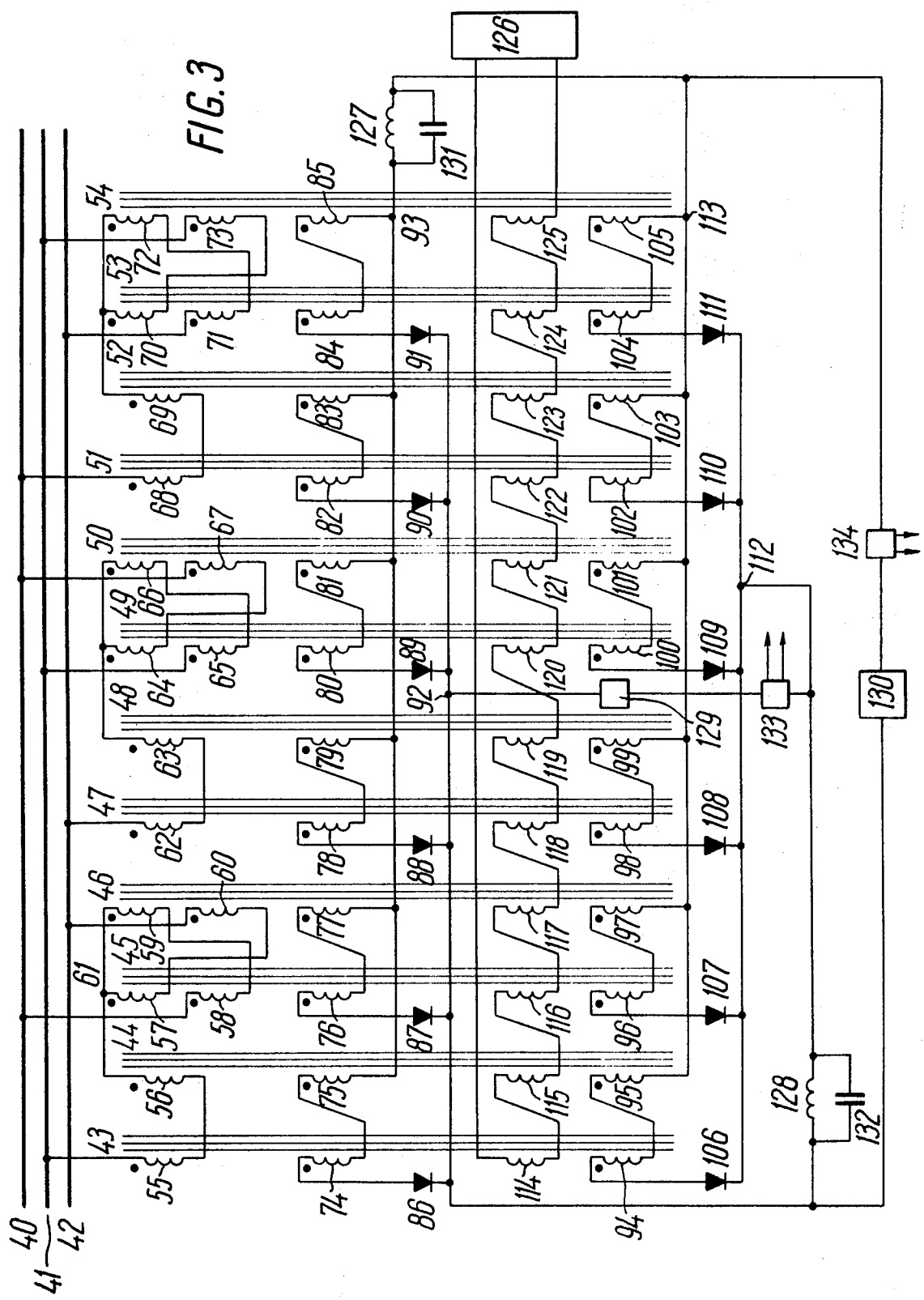

The present invention will further be described by way of example with reference to the accompanying drawings wherein:

FIG. 1 shows the elementary circuit diagram of a single phase of the frequency-controlled electric drive according to the invention with a neutral-point single-phase connection of the output windings:

FIG. 2 (a, b, c) shows the voltage versus time curves at different points of the circuit; and FIG. 3 shows the elementary circuit diagram of a single phase of the frequency-controlled electric drive according to the invention with a neutral-point six-phase connection of the output windings. Referring to FIG. 1, it will be noted that the line paired windings 5, 6, 7 and 8 of the magnetic amplifier are connected in opposition (the beginnings of the windings are marked by points) and are arranged on four magnetic structures 1, 2, 3, and 4 that may be either of a toroidal or U-shaped type. The AC voltage applied to windings 7 and 8 should be shifted by 90° with phase in respect to the voltage that is applied to windings 5 and 6.

A Scott connection of the supply line windings may be employed for providing the required 90° phase shift of a supply from a three-phase source.

The single-stage magnetic amplifier has two second-harmonic outputs, each of which is made up of four paired series-connected secondary windings arranged so that the pairs are in series and in opposition, and of two diodes having a centerpoint connection. Windings 9, 10, 11 and 12 and demodulator diodes 13 and 14 make up one of the outputs (terminals 15 and 16) of the single-stage magnetic amplifier, whereas a windings 17, 18, 19 and 20 and demodulator diodes 21 and 22 make up the second output (terminals 23 and 24). Control windings 25, 26, 27 and 28 are connected in series and are supplied from master-frequency source 29. The latter may be either a variable-speed dynamoelectric generator or a static variable-frequency electronic generator. The amplitude of the master generator output voltage is to be varied in a specific manner according to the changes in the output frequency and the torque applied to the motor shaft, the speed of the latter being taken into account.

When an AC voltage is supplied to control windings 25, 26, 27 and 28 from master-frequency source 29, an AC amplitude-modulated voltage of double frequency appears across secondary windings 9, 10, 11, 12 and 17, 18, 19, 20. After full-wave rectification of the modulated oscillations by diodes 13, 14 and 21 and 22, which are connected in a full-wave circuit having a centerpoint, voltage half-Waves of quadruple frequency that are also amplitude-modulated appear at outputs 15, 16 and 23, 24, i.e. a process of demodulation takes place.

Diodes 13, 14 and 21, 22 serve not only for demodulation, but also for providing an internal feedback that acquires a positive character when a positive half-cycle is supplied by the master generator and becomes negative during the negative half-cycle.

Curve A shown in FIG. 2a represents the voltage curve of the master-frequency source(generator), and curve B shown in FIG. 2b represents the unipolar half-waves of the output voltage that is produced from the half-wave voltage of quadruple frequency and applied to one of outputs 15, 16 or 23, 24 (FIG. 1). It can be seen from FIG. 2b that time intervals $t_n$ due to the effect of the negative internal feedback are established between the half-waves of the output voltage (see curve B).

The duration of intervals $t_n$ can be varied within certain limits by varying the direct current flowing through the bias windings of the amplifier (these windings are not shown in FIG. 1). The bias windings are similar to control windings 25, 26, 27 and 28 and are also connected in series.

The total duration of the unipolar voltage wave and interval $t_n$ (see curve B) is equal to that of the full cycle of the master frequency voltage. Therefore, the frequency of the voltage applied to the output of the magnetic amplifier is twice as small as the frequency of the master generator (see curve A). In order to convert the unipolar pulses into an alternating voltage, it is necessary to change periodically the direction of the current flowing through the load circuit. To this end, the two outputs 15, 16 and 23, 24 of the single-stage magnetic amplifier are connected so as to form two crosswise arms of a bridge circuit. The other two arms of the bridge circuit are made up by connecting the winding of one of the motor phases (their winding being divided into two-semiwindings 30 and 31) to terminals 16, 24 and 15, 23. Noncontact thyristor switches 32 and 33 are inserted into the diagonal of the bridge circuit. Switches 32 and 33 operate in succession during the positive and negative half-cycles of the output voltage of the logical control circuit. Switch 33 will be open when switch 32 is closed, semiwinding 30 of one of the motor phases is supplied from the second output of the magnetic amplifier (points 23 and 24), whereas the second semiwinding 31 is supplied from the other output of the magnetic amplifier (points 15 and 16). In this case, the current flows through semiwindings 30 and 31 from left to right. During the next half-cycle, noncontact switch 32 opens and noncontact switch 33 closes. As a result, semiwinding 30 is supplied from the first output (points 15 and 16) of the magnetic amplifier (points 15 and 16) and semiwinding 31 is supplied from the second output of the amplifier (points 23 and 24). In this case, the current flows through the above-mentioned windings from right to left. Consequently, the above-described mode of operation of noncontact switches 32 and 33 enables changing the direction of the current flowing through semiwindings 30 and 31 for every half-cycle of the output voltage.

Capacitors 34 and 35 are connected in parallel with semiwindings 30 and 31 and serve for filtering the quadruple frequency pulsations. Curve C shown in FIG. 2c illustrates the change in voltage across the motor terminals that occurs when the unipolar voltage half-waves are switches by noncontact switches 32 and 33 and the quadruple frequency pulsations are filtered.

The switching is controlled at moments when the current flowing through semiwindings 30 and 31 equals zero. The moment of switching is controlled by zero-current sensing elements 36 and 37 that supply operating signals to the logical control circuit when the current attains zero value. In the case of small-power electric motors, noninductive shunts of conventional design may be used as sensing elements 36 and 37. When large drives are employed, DC high-frequency transformers may be used as the sensing elements. Sensing elements 38 and 39 are connected in parallel to noncontact switches 32 and 33 and serve for controlling the open and closed positions of the latter in such a manner that the next noncontact switch is closed during the interval of time that follows the opening of the preceding switch. Common Schmidt triggers in combination with stabilitron tubes for limiting the trigger input voltage may be used as voltage sensing elements. Other systems of switching control, for example, the system, wherein current sensing elements are connected in series with noncontact switches 32 and 33, may be employed.

The duration of a single-cycle of the output voltage is twice as long as that of a cycle of the master frequency voltage and, consequently, the frequency of the amplifier output voltage is twice as low as that of the master generator voltage.

In the case of multiphase electric motors, the number of magnetic amplifiers shown in FIG. 1 should be equal to the number of phases of the electric motor. Thus, three amplifiers should be provided for a three-phase motor and two amplifiers are sufficient for a two-phase motor. The phase shift of the control voltages supplied from the master frequency source to the control windings of the magnetic amplifiers of different phases is to be twice as great as the required phase shift of the output voltages, i.e. the phase shift should equal 120°×2=240° for three-phase motors and 90°×2=180° for two-phase motors.

Thus, in the case of a two-phase motor, the control generator may be of a single-phase type since the required 180° phase-shift is obtained by providing an antiparallel or antiseries connection of the control coils of the amplifiers for two phases of the electric motor.

The electric drive according to the invention possesses the following additional advantages as compared with known electric drives in which usual two-stage magnetic amplifiers having a DC output serve as demodulators.

Owing to the employment of a doubled carrier frequency, the maximum frequency of the output voltage is also twice as high. As a result, the range of control is twice as great than in the known drives The installed capacity of the electromagnetic apparatus becomes twice as low, since the conventional two-stage magnetic amplifier is replaced by a single-stage amplifier and the use of a special transformer for supplying the magnetic amplifiers is not necessary.

A multiphase magnetic amplifier, e.g. a six-phase amplifier, may be used instead of the single-phase magnetic amplifier with a double-frequency output. In this case, the output frequency can be considerably increased. Thus, at a supply mains frequency of 50 c.p.s. the maximum output voltage frequency may be as high as 60 c.p.s.

It can be seen from the elementary circuit diagram of a single phase of the electric drive with a single-stage six-phase amplifier (FIG. 3) that the magnetic amplifier is supplied from bus bar 40, 41 and 42 connected to a three-phase AC power supply line. The magnetic amplifier comprises 12 toroidal or U-shaped magnetic core structures 43 through 54.

The amplifier is made up of three identical groups, each of which contains four magnetic core structures. The connection of primary windings of the first group mounted on magnetic core structures 43, 44, 45 and 46 are connected in the following manner. Line windings 55 and 56 arranged on magnetic core structures 43 and 44 have a series-opposing connection, whereas the line windings arranged on magnetic core structures 43 and 44 have a series-opposing connection, whereas the line windings arranged on magnetic core structures 45 and 46 are split into semiwindings 57, 58, 59 and 60. Semiwindings 57, 60 and 58, 59 have a series-opposing connection. The beginnings of semiwindings 57 and 59 are connected together and form a center junction to which the beginning of windings 56 is connected. Consequently, the mains windings that are arranged on magnetic core structures 45 and 46 are connected in series and opposition across bus bar 40 and 42, whereas the mains windings that are arranged on magnetic core structures 43 and 44 are connected between bus bar 41 and center point 61. Such a connection makes up a Scott circuit that provides a 90° phase shift between the terminal voltages of the mains windings arranged on magnetic core structures 43 and 44 and the terminal voltages of the mains windings arranged on magnetic core structures 45 and 46. The voltage across bus bar 41 and point 61 is equal to the line voltage multiplied by $\sqrt{3}/2$, and the voltage across points 1–3 is equal to the line voltage. Therefore, the number of turns of semiwindings 57 to 60 is to be equal to $\sqrt{3}/3$ relative to the number of turns of windings 55 and 56.

The other two groups of magnetic amplifiers are connected in a similar way. The second group comprises magnetic core structures 47 through 50. Magnetic core structures 47 and 48 hold line windings 62 and 63, whereas magnetic circuits 49 and 50 contain line simiwindings 64, 65, 66 and 67. The beginning of winding 62 is connected to bus bar 42, the beginning of semiwinding 65 is connected to bus bar 41, and the beginning of semiwinding 67 is connected to bus bar 40. Thus, the line windings of the second group of amplifiers form a Scott circuit similar to that of the line windings of the first group with a 120° phase shift.

The third group comprises magnetic core structures 51, 52, 53 and 54. Line windings 68 and 69 are mounted on magnetic core structures 51 and 52 and line semiwindings 70, 71, 72 and 73 are placed on magnetic core structures 53 and 54. The beginning of winding 68 is connected to bus bar 40, the beginning of semiwinding 71 is connected to bus bar 42 and the beginning of semiwinding 73 is connected to bus bar 41, i.e. the line windings of the third group of amplifiers form a Scott circuit with a 120° phase shift in respect to the windings of the second group of amplifiers.

The multiphase single-stage magnetic amplifier is provided with two second-harmonic outputs similar to those of the single-phase single-stage magnetic amplifier. Each output of the former amplifier is made up of 12 paired windings connected in opposition so that six pairs of the windings and six diodes constitute a six-phase star-connected circuit with a neutral tap. Thus windings 74, 75, 76, 78, 79, 80, 81, 82, 83, 84 and 85 and demodulator diodes 86, 87, 88, 89, 90 and 91 form one of the outputs of the magnetic amplifier (junctions 92 and 93), whereas windings 94, 95, 96, 97, 98, 99, 100, 101, 102, 103, 104 and 105 and diodes 106, 107, 108, 109. 110 and 111 form the second output of the magnetic amplifier (junctions 112 and 113). Control windings 114, 115, 116, 117, 118, 119, 120, 121, 122, 123, 124, and 125 are connected in series and supplied from master-frequency source 126. At AC supply of the control windings, unipolar output voltage half-waves formed from the 12-fold frequency half-waves appear at outputs 92, 93 and 112, 113 of the magnetic amplifier. The frequency of pulsation of the rectified voltage amounts to 600 c.p.s. at supply from a 50 c.p.s. supply line. Therefore, the upper level of the output frequency can be considerably increased as compared with the electric drive that employs a single-phase magnetic amplifier.

In all other respects, the electric drive with a multiphase magnetic amplifier operates in the same manner as the drive having a single-phase amplifier. The unipolar voltage half-waves are converted into an alternating voltage by periodically changing the direction of the current flowing through semiwindings 127 and 128 of one of the motor phases. This change in direction in accomplished by noncontact thyristor switches 129 and 130. Capacitors 131 and 132 serve for filtering the pulsations of the 12-fold frequency. The process of switching is controlled by zero-current sensing elements 133 and 134.

I claim:

1. In a frequency-controlled AC drive having an electric motor with multiple phases, and an auxiliary source for supplying variable frequency; magnetic amplifiers in each phase of the electric motor and operating in the mode of frequency modulation effected by the variable frequency supplied by said auxiliary source of frequency; said magnetic amplifiers being of a nonreversible type having double-frequency outputs, each output including secondary windings in said magnetic amplifiers and demodulator diodes, the phases of said motor including semiwindings, said outputs of each magnetic amplifier being connected with two semiwindings of one of the phases of said electric motor so as to form a bridge circuit including diagonals, and noncontact switches operating in turn in said diagonals.

2. A frequency-controlled AC drive according to claim 1, wherein the magnetic amplifiers include inputs and the motor is a two-phase motor, including an antiparallel connection of the inputs of the said magnetic amplifiers for individual phases to aid auxiliary source.

3. A frequency-controlled AC drive according to claim 1, wherein the magnetic amplifiers include inputs and the motor is a two-phase motor, including an antiseries connection of the inputs of said magnetic amplifiers for individual phases to said auxiliary source.

4. A frequency-controlled AC drive according to claim 1, including a midpoint circuit connection of said demodulator diodes whereby there results a positive internal current feedback for each magnetic amplifier during the positive half-cycle of the controlling AC voltage and a negative feedback during the negative half-cycle and, after demodulation, the frequency and voltage phase shift at the amplifier output is twice as low as the frequency and voltage phase shift at the input of said amplifier.

5. A frequency-controlled AC drive according to claim 3, wherein the magnetic amplifiers include inputs and the motor is a two-phase motor, including an antiparallel connection of the inputs of said magnetic amplifiers for individual phases to the auxiliary source.

6. A frequency-controlled AC drive according to claim 3, wherein the magnetic amplifiers include inputs and the motor is a two-phase motor, including an antiseries connection of the inputs of said magnetic amplifiers for individual phases to the auxiliary source.

7. A frequency-controlled AC drive according to claim 1, wherein the switches are thyristors.

8. A frequency-controlled AC drive according to claim 1, wherein the auxiliary source is a generator.